April 22, 1930.  H. B. MOSES  1,755,359
RESERVE AND CONSERVATION OF INFLATANTS
Filed May 29, 1926   2 Sheets-Sheet 1
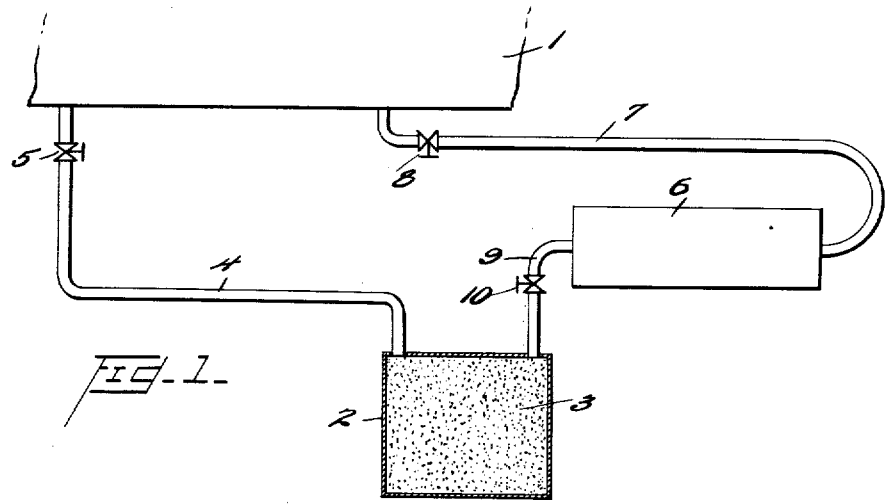
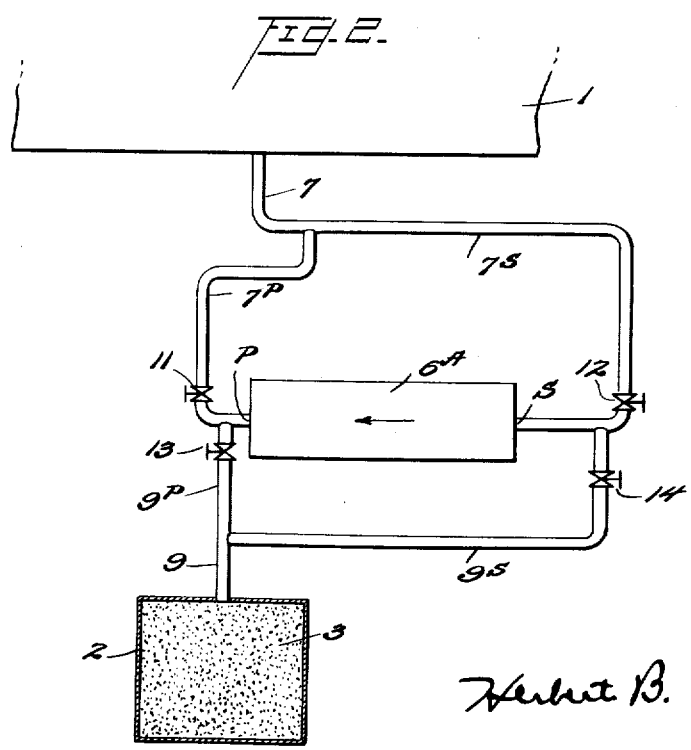
Inventor
Herbert B. Moses April 22, 1930.  H. B. MOSES  1,755,359
RESERVE AND CONSERVATION OF INFLATANTS
Filed May 29, 1926   2 Sheets-Sheet 2
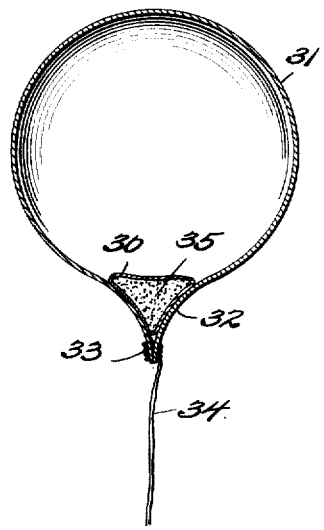
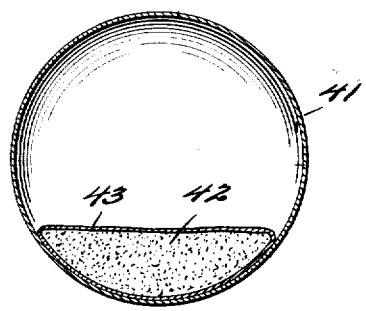
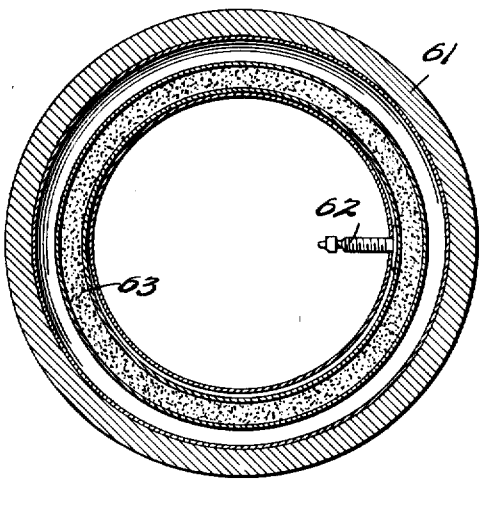
Inventor
Herbert B. Moses Patented Apr. 22, 1930

1,755,359

UNITED STATES PATENT OFFICE

HERBERT B. MOSES, OF WASHINGTON, DISTRICT OF COLUMBIA

RESERVE AND CONSERVATION OF INFLATANTS

Application filed May 29, 1926. Serial No. 112,735.

REISSUED

My invention relates to the conservation and conservative use of gases, and objects thereof are the maintenance of predetermined pressures or volumes thereof, or both, in confined spaces, although the quantity of such gases be subject to changes; the control of changes in volume or pressure of such gases for the preservation of the pressure of gases although the volume thereof may apparently be subject to change; the preservation of the volume of gases although the pressure thereof may apparently be subject to change; the control of changes in pressure or volumes of gases, and to methods and means for maintaining either the pressure or the volume of gases, or both, constant, or for varying either or both, as desired, under conditions where either one or both may otherwise be subject to undesirable changes.

While my invention is applied principally to gases, under which term I include vapors, it is to be understood that it may be applied to liquids, that is to all fluids.

My invention is applicable to a number of uses, for example to balloons of various types such as toy balloons or lighter-than-air aircraft, to pneumatic tires for automobiles, to playing balls such as tennis balls, foot balls and the like, to shock absorbers, and also to other uses as will be apparent from the appended description; and one of the main features of my invention comprises the use of a sorbent, preferably solid and having highly sorbent properties, present either in the space in which the gases to be affected are present or within a container suitably connected therewith.

I may use platinum black as the highly adsorptive material, or I may use in place thereof any of the well known types of activated carbon, or silica gel which may be prepared according to the process set forth in the United States patent to Patrick, No. 1,297,724, or otherwise, or the properly dehydrated similar substance as described by Graham in Liebig's Ann. vol. 121 (1862) pages 36–39; or I may use any of the impregnated porous sorbents, the pores whereof are coated or impregnated to aid sorption, such for example as pumice stone or silica gel carrying a sorbent in its pores, which carried sorbent may be specially prepared iron oxide or aluminum oxide, or platinum black; and the carried sorbent may be silica gel if the carrier is other than silica gel, or I may use any other equivalent sorbent material of any nature whose sorbent properties may be greater or less than those mentioned.

The sorbent material is preferably solid, but in certain cases a liquid sorbent may be used either alone or in combination with a solid sorbent; and if solid it may be used in block or in powder form, or in granular form the size of the granules of which may vary according to circumstances. This will depend somewhat on the sorbent used and on the conditions and purposes for which it is to be used. I may state, however, that generally good results are obtainable with fairly small sized granules having a dimension of about one sixteenth, or one thirty-second of an inch, more or less, or a more powdery form, and if platinum black is used, it is used in the state in which it is usually prepared as such.

The invention is applicable to a great variety of gases among which may be mentioned hydrogen, oxygen, air, methane and other hydrocarbon gases, helium, as well as other types of gases, it being understood of course that a proper choice of sorbent or mixture of sorbents for a particular gas or mixture of gases is advantageous inasmuch as the sorbent effects of any sorbent may be different for different materials to be sorbed, and the different sorbents may have different sorbing capacities.

In inflated devices such as balloons, playing balls, pneumatic automobile tires and the like, it is frequently desirable to maintain substantially constant the pressure or volume or both of the gas within the inflated device, while in some cases, as for example, with respect to some balloons, it is frequently desirable to vary the pressure or volume or both of the gas therewithin and to control such variations, and my invention provides a means for replacing automatically or otherwise any air or other gas lost through seepage or leakage; as well as a means for storing gas within a comparatively very small space for later use and such effect is obtained by the presence of a suitable quantity of a suitable sorbent within such device, or within a container suitably connected with such device. It will thus be apparent that some of the gas or mixture of gases pumped into the device will be accumulated therein under pressure in the usual way and some of such gas will be sorbed, either absorbed or adsorbed, by the sorbent, the degree of sorption varying with the pressure or partial pressure of the gas within the device and with sorptive capacity of the sorbent or sorbents for the gas or gases. Then as leakage or seepage occurs, the pressure which would decrease to a greater extent if the sorbent were not present, is maintained constant, or at least more constant, by reason of the fact that the sorbent material liberates some of the sorbed gas on decrease of pressure, as a result of which there is a tendency of the effective pressure within the device to decrease much more slowly than if the sorbent material were not present. The combination of the inflated devices and the sorbent material may be obtained in any desirable way, and as an example I may state that it may be inserted within the device through the opening at which a valve may later be attached or if no valve is used it may be inserted through another opening by means of which inflation is obtained, or otherwise as may be convenient.

My invention furthermore provides a means for storing and conserving for future use such gases as it may be desirable to remove temporarily from the inflated device, and to return such stored gases to the inflated device when desired.

Referring to the appended drawings which form a part of this application:

Fig. 1 is a diagrammatic sectional view of one form of my invention applied to a balloon which may or may not be of the dirigible type, as desired.

Fig. 2 is a diagrammatic sectional view of a modification thereof.

Fig. 3 is a diagrammatic sectional view of a toy balloon having my invention applied thereto.

Fig. 4 is a diagrammatic sectional view of a playing ball having my invention applied thereto.

Fig. 5 is a diagrammatic sectional view of a pneumatic tire having my invention applied thereto.

Fig. 6 is a diagrammatic sectional view of a pneumatic tire illustrating a modification of my invention.

Referring to Fig. 1, 1 designates a buoyant gas container of a balloon structure, the container being either elastic or otherwise capable of change in interior volume thereof, to the interior of which is suitably connected a vessel 2 containing a suitable sorbent material 3. The connection between the two containers designated 1 and 2 may be made in any suitable manner, for example by means of a conduit 4 preferably having therein the valve 5, or such connection between the two containers may be made by means of a reversible compressor diagrammatically indicated at 6. For convenience, this compressor is shown as connected to the container 1 by a conduit 7 having therein the valve 8, and to the container 2 by means of a conduit 9 having therein the valve 10. While the connection including the conduit 4 may be used in combination with the connection including the reversible compressor 6 to connect the two containers 1 and 2, nevertheless either connection may be used alone without the other. When the reversible compressor 6 is present, it may be used for pumping gases either from the container 1 to the container 2 or vice versa.

The altitude above sea level of the balloon may be controlled to some extent by means of the rudder structure usually present in dirigible balloons, or by means of my invention alone, or by a combination of the two; and such altitude may be controlled by means of my invention in spite of the more or less uncontrollable changes which ordinarily may take place, such as changes in the gross weight of the craft, in the temperature corresponding volume of the gas, in the density of the atmosphere, and the like.

The operation of the hereinbefore described device is as follows:

If it is desired to cause descent of the balloon, the valve 5 may be opened whereupon the gas in the conduit 4 which should be of such a nature that it will be sorbed by the sorbent 3, will be contracted within and drawn through the conduit 4 by the action of the sorbent, and this will cause withdrawal of the gas present in the container 1 and in the conduit 4 and into the container 2 and into the sorbent 3. While such operation is possible without the use or presence of the connection between the containers 1 and 2 comprising the conduits 7 and 9 and the compressor 6, nevertheless such operation will not be nearly as effective as if such a compressor be used. Such compressor 6 is preferably used to cause a flow of gases from the container 1 to the container 2 wherein such gases are taken up or sorbed by the sorbent 3 until the desired required amount of buoyant gas has been removed from the buoyant gas container, whereupon the valves 8 or 10 or preferably both may be closed, it of course being understood that during the operation of the compressor, the valve 5 is preferably kept closed, if the conduit 4 be used.

Should ascent of the balloon be desired, it may be possible to cause a flow of gas from the container 2 to the container 1 through the conduit 4 by simply opening the valve 5, but the successful operation will depend on the relative pressures within the various parts and the degree of saturation of the sorbent. The most practical way of causing passage of gases from the container 2 to the container 1 is by means of the reversible pump 6, by reason of the reversibility of which gases may be pumped therethrough in either direction, it of course being understood that the valves 8 and 10 are open during the operation.

It will thus be clear that the connection between the containers 1 and 2 through the conduit 4 may be disposed of entirely, gases being made to pass between the containers 1 and 2 in either desired direction.

Gases removed from the container 1 for the purpose of aerial navigation or for other purposes are, according to my invention, not lost but are stored within the container 2 by the aid of the sorbent 3 and they can later be used again in the container 1.

Any suitable means may be used for causing gases to pass in either desired direction between the containers 1 and 2 such as that illustrated in Fig. 1, already described, or that illustrated in Fig. 2 or any other means which will have a similar effect.

Referring to Fig. 2, 1 again designates a buoyant container, 2 a storage container and 3 sorbent material within the storage container 2. The irreversible pump 6ª which will pump in one direction only, connects the two containers 1 and 2 by means of conduits 7 and 9, as in Fig. 1, but here each of the conduits 7 and 9 comprises two branches 7P, 7S and 9P, 9S respectively, the branches 7P and 9P connecting with the pressure end P of the pump, and the branches 7S and 9S connecting with the suction end S of the pump. Each of these branches 7P, 7S, 9P, and 9S includes a valve designated 11, 12, 13 and 14 respectively. To pump from the container 1 to the container 2 the valves 12 and 13 are opened, while the valves 11 and 14 are left closed; while to pump from the container 2 to the container 1, the valves 11 and 14 are open while valves 12 and 13 are closed. It is understood, of course, that it is best to close all the valves 11, 12, 13 and 14 when the right amount of gas is within the container 1.

Hydrogen is ordinarily used in balloons. The same may be used in my invention or any other desired suitable gas may be substituted therefor. Platinum black is a very efficient solid adsorbent for hydrogen and may be used, as may any other material having equivalent sorbent powers. Hydrogen and platinum black are stated here merely by way of example, but the explosive qualities of hydrogen frequently make it desirable to use a substitute therefor, while the high cost of platinum black may likewise make it desirable to replace this with another sorbent.

It is, of course, understood that the gas container as illustrated at 1 on Figs. 1 and 2 is more or less diagrammatically shown and that instead of a single inflatable gas container there may be a multiplicity thereof as is usual in the case of dirigible balloons at the present time, and the invention is applicable to the so called ballonets.

My invention also comprises placing the sorbent material directly within the inflated device as may be done in toy balloons, inflated playing balls of various types, air cushions, automobile tires, shock adsorbers, and the like. Referring to Fig. 3, 31 designates a toy balloon of the usual type having the inflation vent 32 sealed by a string 33, the string 34 being for the purpose of tying or holding the balloon. This balloon contains the sorbent 35 wherein some of the gases within the balloon 31 are concentrated, thus permitting of charging of the balloon 31 with an excess of gas without undue expansion of the balloon. Losses which occur due to seepage or leakage of gases through the balloon material or some defective part thereof or through the insufficiently sealed vent, or to other causes, are compensated for wholly or at least to some extent by liberation of gases from the sorbent due to the decrease in pressure of the sorbed gas. As a result the life of the toy balloon is longer with the sorbent present than in its absence. The sorbent material 35 may be held within a suitable container 36, through which the gas may pass, within the balloon, if desired, but such container is not essential.

Referring to Fig. 4, 41 designates an inflated playing ball such as a foot ball, tennis ball and the like, having therewithin sorbent material 42 and if desired, this sorbent material may held within a container 43 of the above mentioned type which, however, is not essential. In this device the sorbent material will function substantially the same as in the toy balloon described above and will have about the same kind of effect.

Referring to Fig. 5, 51 designates a pneumatic tire which may have the usual inflation valve 52, the tire containing the sorbent material 53 which, if desired, may be held within a container 54 of the above mentioned type, but again such container is optional.

Referring to Fig. 6, 61 designates likewise a pneumatic tire which may have the usual valve 62, and in this case the sorbent material if solid may be contained within the annular sack or container 63 of the above mentioned type.

The containers 36, 43, 54, and 63 above referred to may be of textile material and the mesh or sizing thereof is preferably such that the granular sorbent material will be retained thereby, while still permitting passage of gas through such container.

With respect to the modifications illustrated in Figs. 3, 4, and 5 where the devices are in continuous or intermittent motion at least for a period of time, it may even be desirable to omit the containers 36, 43, and 54.

While various gases and various sorbents therefor may be used, it is of course sometimes necessary to use a particular gas and in such cases a suitable sorbent therefore should be chosen. In other cases the particular gas used may be immaterial, and here it may be best to first choose the sorbent and then choose a gas which will properly cooperate therewith. It may even be desirable at times to make use of a mixture of gases, one, or more, or all of the components thereof being sorbable by the sorbent which likewise may be a single material or a mixture or other combination of sorbents.

The degree of effectivness of my invention will depend to some extent on the relative strengths and elasticities of the walls of the containers, on the pressures used, and on the particular gases or sorbents used, as well as on the sorptive relations between such gases and sorbents.

What I claim is:

1. An inflatable device, an inflatant therewithin, and a potential absorbed inflatant therein more concentrated than and in direct contact with said first mentioned inflatant.

2. Aircraft including an inflatable device, gas for inflating said device therewithin, and a solid highly adsorbent material for said gas within said device in constant open operative relation therewith.

3. An aircraft comprising an inflatable device containing gas, a container, solid sorbent material within said container, a connection between said inflatable device and said container, a reversible pump in solid connection, and a valve in said connection on each side of said reversible pump.

4. An aircraft comprising an inflatable device containing buoyant gas, a container, a solid adsorbent material within said container having the power to adsorb said gas, a connection between said inflatable device and said container, pump means in said connection for passing gas in either direction desired between said inflatable device and said container, and a valve in said connection to control the flow of gas to or through said pump means.

5. An aircraft comprising an inflatable device containing buoyant gas, a container, a solid adsorbent material within said container having the power to adsorb said gas, a connection between said inflatable device and said container, pump means in said connection for passing gas in either direction desired between said inflatable device and said container, and a valve in said connection between said pump device and said inflatable device and another valve between said pump device and said container.

6. An aircraft comprising an inflatable device containing buoyant gas, a container, a sorbent material within said container having the power to absorb said gas, a connection between said inflatable device and said container, pump means in said connection for passing gas in either direction desired between said inflatable device and said container, and a valve in said connection to control the flow of gas to or through said pump means.

7. An aircraft comprising an inflatable device containing buoyant gas, a container, a sorbent material within said container having the power to adsorb said gas, a connection between said inflatable device and said container, pump means in said connection for passing gas in either direction desired between said inflatable device and said container, and a valve in said connection between said pump device and said inflatable device and another valve between said pump device and said container.

8. An aircraft comprising an inflatable device containing gas, a container, highly adsorbent material within said container, a connection between said inflatable device and said container, and means for pumping gas in either desired direction between said inflatable device and said container.

9. An aircraft comprising an inflatable device containing gas, a container, highly adsorbent material within said container, a connection between said inflatable device and said container, and means for pumping gas in either direction between said inflatable device and said container and for preventing flow of gas as desired.

10. An inflatable device adapted to be inflated by a gas, and highly adsorbent material within said device adapted to contact with and adsorb the inflating gas.

11. An inflated device containing an inflatant gas, and highly adsorbent material within said device in free contact with said inflatant gas.

12. An elastic inflatable device adapted to be inflated by a gas, and highly adsorbent material within said device adapted to contact with and adsorb the inflating gas.

13. An elastic inflated device containing an inflatant gas, and highly adsorbent material within said device in free contact with said inflatant gas.

14. In combination, a storage tank for gas, a sorbent for said gas within said storage tank, and a quickly acting means connected to said storage tank for quickly moving said gas to and from said tank.

15. In combination, a storage tank for gas, a highly adsorbent material for said gas within said storage tank, and a quickly acting means connected to said storage tank for quickly moving said gas to and from said tank.

16. In combination, a storage tank for gas, a sorbent for said gas within said storage tank, and a quickly acting pumping means connected to said storage tank for pumping said gas thereto or therefrom.

17. In combination, a storage tank for gas, a highly adsorbent material for said gas within said storage tank, and a quickly acting pumping means connected to said storage tank for pumping said gas thereto or therefrom.

18. In combination, a storage tank for gas, a sorbent for said gas within said storage tank, a receptacle wherein said gas is used, and a quickly acting pumping means connected to said storage tank and to said receptacle for quickly moving said gas in either direction between said storage tank and said receptacle.

19. In combination, a storage tank for gas, a highly adsorbent material for said gas within said storage tank, a receptacle wherein said gas is used, and a quickly acting pumping means connected to said storage tank and to said receptacle for quickly moving said gas in either direction between said storage tank and said receptacle.

HERBERT B. MOSES.

CERTIFICATE OF CORRECTION.

Patent No. 1,755,359.　　　　　　　　　　　Granted April 22, 1930, to

HERBERT B. MOSES.

It is hereby certified that error appears in the printed specification of the above numbered patent requiring correction as follows: Page 4, line 25, claim 1, for "absorbed" read adsorbed; same page, line 37, claim 3, for "solid" read said; and that the said Letters Patent should be read with these corrections therein that the same may conform to the record of the case in the Patent Office.

Signed and sealed this 10th day of March, A. D. 1931.

(Seal)

M. J. Moore,
Acting Commissioner of Patents.

connected to said storage tank for pumping said gas thereto or therefrom.

17. In combination, a storage tank for gas, a highly adsorbent material for said gas within said storage tank, and a quickly acting pumping means connected to said storage tank for pumping said gas thereto or therefrom.

18. In combination, a storage tank for gas, a sorbent for said gas within said storage tank, a receptacle wherein said gas is used, and a quickly acting pumping means connected to said storage tank and to said receptacle for quickly moving said gas in either direction between said storage tank and said receptacle.

19. In combination, a storage tank for gas, a highly adsorbent material for said gas within said storage tank, a receptacle wherein said gas is used, and a quickly acting pumping means connected to said storage tank and to said receptacle for quickly moving said gas in either direction between said storage tank and said receptacle.

HERBERT B. MOSES.

CERTIFICATE OF CORRECTION.

Patent No. 1,755,359.  Granted April 22, 1930, to

HERBERT B. MOSES.

It is hereby certified that error appears in the printed specification of the above numbered patent requiring correction as follows: Page 4, line 25, claim 1, for "absorbed" read adsorbed; same page, line 37, claim 3, for "solid" read said; and that the said Letters Patent should be read with these corrections therein that the same may conform to the record of the case in the Patent Office.

Signed and sealed this 10th day of March, A. D. 1931.

(Seal)

M. J. Moore,
Acting Commissioner of Patents.